US006844629B2

(12) United States Patent
Chen et al.

(10) Patent No.: US 6,844,629 B2
(45) Date of Patent: Jan. 18, 2005

(54) DISPLAY PANEL WITH BYPASSING LINES

(75) Inventors: Shan-Te Chen, Chia Yi Hsien (TW);
Chih-Sung Wang, Chu Pei (TW);
Chin-Chen Yang, Chu Pei (TW);
Sheng-Lun Su, Ping Tung Hsien (TW);
Ke-Feng Lin, Taipei (TW)

(73) Assignee: Au Optronics Corp., Hsinchu (TW)

( * ) Notice: Subject to any disclaimer, the term of this patent is extended or adjusted under 35 U.S.C. 154(b) by 0 days.

(21) Appl. No.: 10/609,597

(22) Filed: Jul. 1, 2003

(65) Prior Publication Data

US 2004/0056331 A1 Mar. 25, 2004

(30) Foreign Application Priority Data

Sep. 10, 2002 (TW) ........................................ 91120655 A

(51) Int. Cl.[7] ............................................... H01L 23/48
(52) U.S. Cl. ..................... 257/773; 257/776; 257/59; 257/72; 257/920
(58) Field of Search ................................ 257/773, 776, 257/59, 72, 920

(56) References Cited

U.S. PATENT DOCUMENTS

2004/0056331 A1 * 3/2004 Chen et al. ................. 257/629

* cited by examiner

Primary Examiner—Mark V. Prenty
(74) Attorney, Agent, or Firm—Troxell Law Office PLLC

(57) ABSTRACT

A display panel comprises the following elements. A pixel array arranged by a plurality of pixel devices is applied for producing images according to input signals. A plurality of COG chips are fabricated on a peripheral region of the display panel and connected in series wherein the COG chips can convey the input signals to the pixel array for driving selected the pixel devices. A plurality of WOA lines are defined on the display panel for connecting the COG chips in series to transfer the input signals. And a first bypassing bus is fabricated aside the COG chips and connected separately to two different WOA lines for connecting with at least one the COG chip in parallel so as to bypass the input signals.

13 Claims, 4 Drawing Sheets

DISPLAY PANEL WITH BYPASSING LINES

FIELD OF THE INVENTION

The present invention relates to an approach to promote the electrical connecting performance of liquid crystal displays by using flexible printed circuit boards (FPCs) and, more specifically, to a design of disposing flexible printed circuit boards onto display panels to overcome the high resistance of chip on glass (COG) and wire on array (WOA).

BACKGROUND OF THE INVENTION

With rapid advancement of the fabrication technology of a thin film transistor liquid crystal display (TFT-LCD), the LCD is largely applied in various electronic products such as a Personal Digital Assistant (PDA) device, a laptop, a digital camera, a video camera, and a mobile phone due to the fact it has advantages of smaller size, less weight, lower power consumption and low radiation. Moreover, the quality of the LCD is ceaselessly improved and the price thereof is continuously decreased since manufacturers aggressively invest in research & development and employ large-scale fabricating equipment. That promptly broadens the applied fields of the LCD.

Please refer to FIG. 1, the structure of a typical LCD panel is illustrated. Generally speaking, in the fabricating procedures of LCD panels, processes such as film depositing and lithography are applied repeatedly to fabricate considerable quantities of thin film transistors (TFT), pixel electrodes, scan lines and data lines arranged in a crisscross pattern for constructing the pixel array on a lower glass substrate 10. Then, an upper glass substrate 12 with a color filter manufactured thereon is disposed over the lower glass substrate 10. And a liquid crystal layer is inserted and sealed between the upper and lower glass substrate 12 & 10 to constitute the LCD panel.

For providing the desired voltage and signals to operate the thin film transistors of each pixel device, on the peripheral areas of the panel some circuits, chips and devices are fabricated. As shown in FIG. 1, beneath the lower glass substrate 10 a printed circuit board 14 is connected. The printed circuit board 14 has a timing controller chip and several source driver IC chips 16 thereon for electrical connecting to each pixel device via the data lines on the LCD panel. Each source driver IC chip 16 is respectively connected to display panel with a flexible bus 18 and electrical connected to the pixel devices via the circuit patterns formed on the display panel.

Except the source driver IC chips 16 below the display panel, some gate driver IC chips 20 are fabricated on the right area of the lower glass substrate 10 for connecting to each pixel device via the scan lines. It is noted that, generally, these gate driver IC chips 20 are fabricated directly on the lower glass substrate 10 by the chip on glass (COG) technique. Because the reserved area on the right side of the display panel is very narrow, the gate driver IC chips 20 are disposed and connected in cascade along the right edge of the display panel. By using some WOA (wire on array) lines defined on the lower glass substrate, all the gate driver IC chips are connected together in a series.

However, when the size of display panel desired is unceasingly increased, both the number of the gate driver IC chips 20 and the length of the WOA lines 22 are raised so as to cause the resistance and the loading too high. Especially, the width of each WOA line 22 on the lower glass substrate 10 is merely 50 micron, so the high resistance of the WOA lines 22 will severely degrade the signal intensity. And because each gate driver IC chip 20 also possesses considerable resistance, the decreasing signal intensity cannot effectively operate related devices when the number of the gate driver IC chips in cascade is increasing. Especially for the gate driver IC chips 20 arranged in the rear end of the series, the excessive degraded signals and voltage cannot drive the pixel devices effectively so as to result in serious loading problems.

SUMMARY OF THE INVENTION

An objective of the present invention is to provide a display panel with flexible printed circuit boards connected in parallel to COG (chip on glass) chips or WOA (wire on array) lines for reducing resistance thereof.

Another objective of the present invention is to provide a design of chips connection for the display panels with large size to prevent the chips in series from signals degradation.

The display panel disclosed in this present invention comprises the following elements: a pixel array arranged by a plurality of pixel devices is applied for producing images according to input signals; a plurality of COG chips are fabricated on a peripheral region of the display panel and connected in series, wherein the COG chips can convey the input signals to the pixel array for driving selected the pixel devices; a plurality of WOA lines are defined on the display panel for connecting the COG chips in series to transfer the input signals; and a first bypassing bus is fabricated aside the COG chips and connected separately to two different WOA lines for connecting with at least one the COG chip in parallel so as to bypass the input signals.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
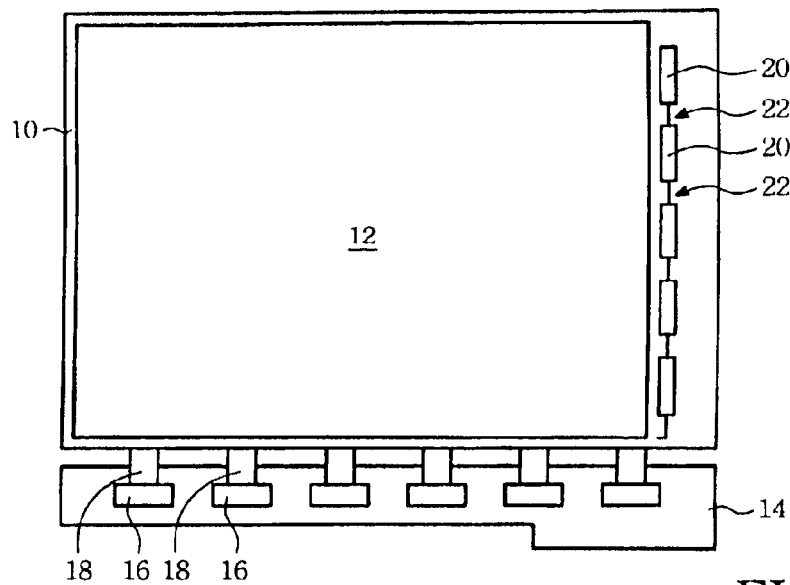
FIG. 1 is a schematic top view of a liquid crystal display panel in the prior art.
Figure 2:
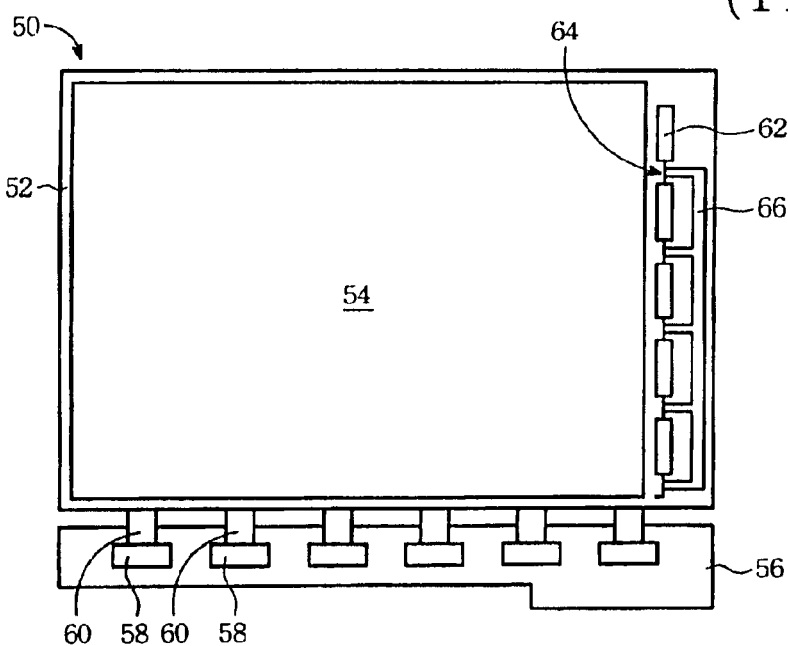
FIG. 2 is a schematic top view of a liquid crystal display with bypassing, lines according to the present invention.

Please refer to FIG. 2, the manner of applying a flexible printed circuits board to provide signals bypassing paths according to the present invention is illustrated. As above-mentioned, a liquid crystal display panel 50 comprises a lower glass substrate 52, an upper glass substrate 54, and a liquid crystal molecules layer placed in between these two glass substrates 52 & 54. In generally, on the lower glass substrate 52 a large number of TFTs, scan lines and data lines in a crisscross pattern are fabricated to constitute the pixel array. And beneath the upper glass substrate 54 a color filter (CF) film is fabricated so as to produce desired images via the inserted liquid crystal molecules layer after associating with the lower glass substrate 52.

Besides, for effectively operating the TFTs in the LCD panel 50, beneath the LCD panel 50 a printed circuits board (PCB) 56 is connected for transferring driving signals to the LCD panel 50 via a timing control chip (not shown) and source driver IC chips 58 on the PCB 56, and a flexible bus 60. And on the right side of the lower glass substrate 52, a narrow bar area is reserved for fabricating gate driver IC chips 62 and WOA (wire on array) lines 64. Via the WOA lines 64 defined on the lower glass substrate 52, these gate driver IC chips 62 are connected together in series.

In general, the gate driver IC chips 62 are fabricated directly on the lower glass substrate 52 by using the chip on glass (COG) technique so as to transfer scan signals to the pixel array and drive the selected pixel devices. As to the WOA lines 64 are directly defined on'the lower glass substrate 52 and disposed among those gate driver IC chips 62 so as to connect all the gate driver IC chips 62 in series. Thus, the control signals can be transferred from the PCB 56 to the pixel array of LCD panel 50 via these gate driver IC chips 62 and the WOA lines 64. And especially, via the WOA lines the control signals can be conveyed from the leading ones to the rear ones of the serial gate driver IC chips 62 to ensure that each gate driver IC chip 62 can receive the control signals.

For solving the resistance and loading issues caused by the serial gate driver IC chips 62 and the WOA lines 64, in the present invention a bypassing bus 66 is disposed beside the gate driver IC chips 62 and connected to each WOA line 64 among the gate driver IC chips 62 so as to provide extra paths for bypassing the control signals. Namely, for each gate driver IC chip 62 in series, the bypassing bus 66 is connected with it in parallel. In a preferred embodiment, the bypassing bus 66 is made of a flexible printed circuit (FPC) board. Further, as shown in the FIGURE, the layout of bypassing bus 66 is designed with a comb shaped structure and can be divided to a long vertical line and a plurality of short horizontal lines. The long vertical line is disposed parallel with the serial gate driver IC chips 62, and the short lines connected to said long vertical line are extending horizontally to connect with each WOA line 64. Thus, by using the comb shaped bypassing bus 66, all the gate driver IC chips 62 are connected in parallel so as to reduce the resistance for transferring signals.

Figure 3A:
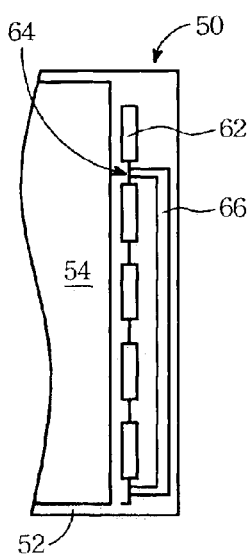
FIGS. 3A~C are partial schematic top views of liquid crystal displays illustrating different layout designs of the bypassing lines according to the present invention.
Figure 3B:
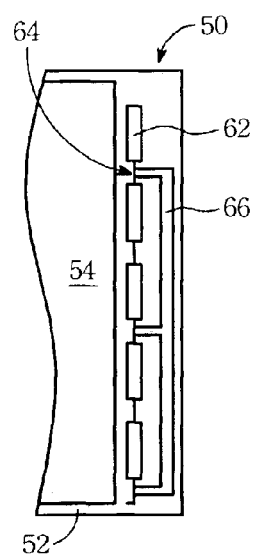
Figure 3C:
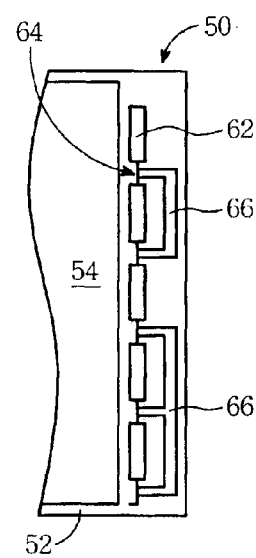

It is noted that in FIG. 2 the bypassing bus 66 is connected with each WOA line 64 separately to connect each gate driver IC chip 62 in parallel, however, in actual practice, the connection of the bypassing bus 66 can be arbitrarily adjusted according to different condition. Especially for some sorts of LCD panels the usable area on the right side thereof maybe very small. In such cases, it is not required to make the bypassing bus 66 connect with each WOA line 64. And an option is to let the bypassing bus 66 merely connect with some selected WOA lines 64. For instance, refer to FIGS. 3A~C, several different connecting manners are shown. In FIG. 3A, the bypassing bus 66 is just connected with the first one and the last one gate driver IC chips 62; in FIG. 3B, the bypassing bus 66 is connected with some WOA lines 64; and in FIG. 3C, two bypassing buses 66 are applied to individually connect with some gate driver IC chips 62 in parallel.

Figure 4:
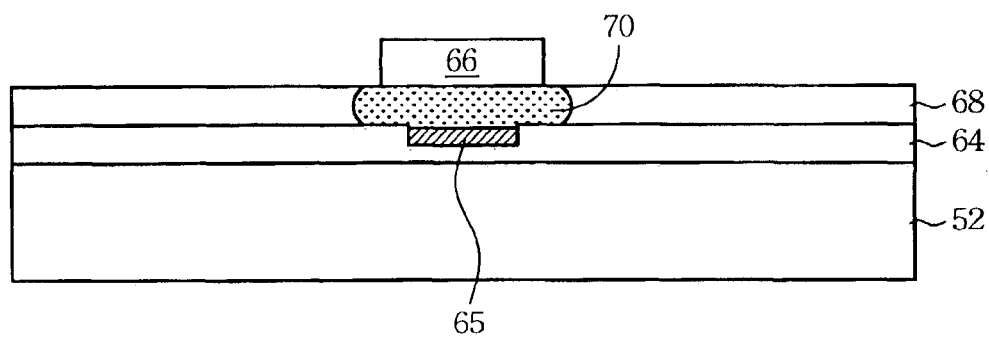
FIG. 4 is a schematic cross sectional view of the LCD panel illustrating the bypassing bus is connected with the WOA lines by using an anisotropic conductive film (ACF) according to the present invention.

Please refer to FIG. 4, the manner of connecting the bypassing bus 66 with the WOA lines 64 is shown. In the typical process of fabricating the WOA lines 64 on the lower glass substrate 52, the necessary metal line patterns are firstly defined, and then a passivation layer is deposited thereon to prevent the metal line patterns from oxidation or short road with other conducting lines. Therefore, before connecting the bypassing bus 66, it is required to remove portions of the passivation layer at the connecting locations so as to expose portions of the metal lines 65. Next, an anisotropic conductive film (ACF) 68 is coated on the WOA lines 64, and the short horizontal lines of the comb shaped bypassing bus 66 are pressed to adhere onto the ACF 68 above the metal lines 65. Certainly, for the bypassing bus 66, a partial insulating surface thereof is peeled off to expose inner metal lines for contacting the WOA lines 64. Thus, the partial ACF 68 to be pressed can release conducting ions and form a conducting region 70 so as to electrical connecting the bypassing bus 66 and the metal lines 65.

Furthermore, the bypassing bus 66 is applied to provide an extra bypass path with less resistance for overcoming the high resistance issue of the WOA lines 64, so the bypassing bus 66 can be designed with other different shapes rather than the comb shape to reduce the wiring resistance. For example, refer to FIG. 5, the bypassing bus 76 adhered onto the lower glass substrate 52 can be designed with a bar shape, and on the left edge of the bar several rectangular gaps are defined. When this bar shaped bypassing bus 76 is adhered onto the LCD panel 50, these rectangular gaps are applied to receive each the gate driver IC chip 62. As to the bulges of the bar shaped bypassing bus 76 just right cover over the WOA lines.

Figure 5:
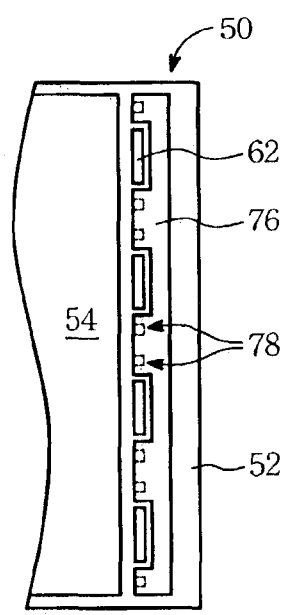
FIG. 5 is a partial schematic top view of the liquid crystal displays illustrating the layout of the bypassing bus according to another embodiment of the present invention.

It is noted that, as shown in FIG. 5, the dotted squares 78 on the left bulges of the bar illustrate the locations of the bypassing bus 76 for connecting with the WOA lines. Namely, the insulating surface of the bypassing bus 76 in the dotted squares 78 will be removed so as to let the bypassing bus 76 connect with the WOA lines. Another manner to solve the high wiring resistance is connecting two terminals of the bypassing bus separately to two ends of one WOA line. In other words, the bypassing bus 76 is connected with each WOA line in parallel to provide a bypass path for reducing the resistance. As aforementioned, the bypassing bus 76 can be made of a FPC board.

Figure 6A:
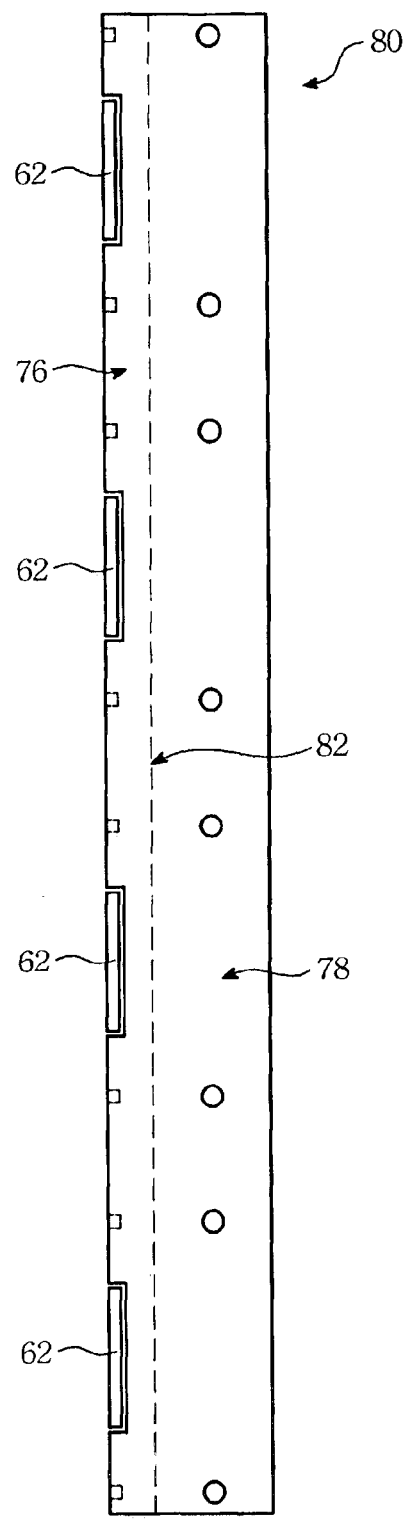
FIGS. 6A~B are schematic top views of the FPC boards illustrating the manner of attaching the FPC boards onto the LCD panel.
Figure 6B:
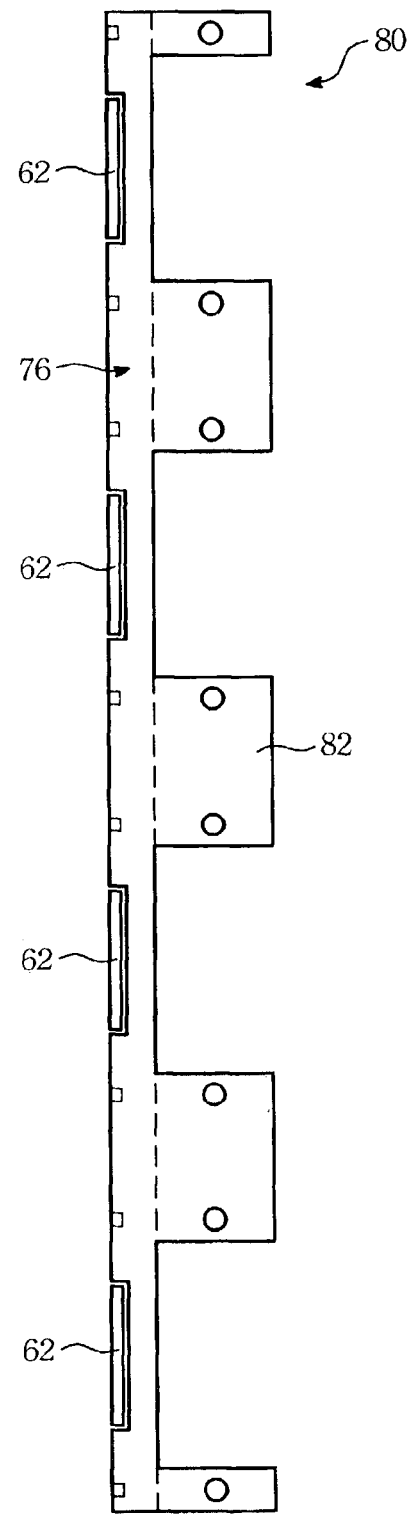

Next, refer to FIGS. 6A & 6B, the process to adhere the bypassing bus onto the lower glass substrate is illustrated. In general, because the right side area of the lower glass substrate for fabricating the gate driver IC chips is very small, the FPC board will be designed as shown in FIG. 6A in the process of manufacturing the bypassing bus 76. The left side of the bar shaped FPC board 80 has a vertical dotted line 82 traversing the whole FPC board 80. By introducing the dotted line 82, the FPC board can be divided into the bypassing bus 76 at left side and an alignment material 78.

As shown in FIG. 6A, the alignment material 78 has a large wideness rather than the bypassing bus 76. Thus, the robot arm can conveniently clip the alignment material 78 to move the FPC board 80 over the LCD panel, and by precisely aligning and attaching procedures to adhere the bypassing bus 76 onto the LCD panel and aside the gate driver IC chips 62. After adhering the bypassing bus 76 onto the LCD panel, the alignment material 78 can be cut off along the dotted line 82 as shown in FIG. 5. Surely, for the convenience of aligning and adhering the bypassing bus 78, the alignment material 78 also can be cut firstly to remove a portion thereof as shown in FIG. 6B.

The bypassing bus provided in this invention has the following advantages: (1) Because the FPC board possess better conductivity, the bypass path connected in parallel with the gate driver IC chips or the WOA lines can reduce the resistance therein; (2) Even though the number of the gate driver IC chips or length of the WOA lines increasing, by using the bypassing bus with less resistance the unabridged control signals still can be transferred to the rear gate driver IC chips in series. Thus, the signal degradation and loading deficiency issues can be overcome effectively.

As is understood by a person skilled in the art, the foregoing embodiments of the present invention are illustrated of the present invention rather than limiting of the present invention. For instance, in above embodiment the gate driver IC chips fabricated by the COG technique are applied for illustration. However, for those who skilled in the art, it is apparently to apply the bypassing bus to other COG chips or any chips in series connection so as to reduce resistance and to prevent signals from degradation. It is intended to cover various modifications and similar arrangements included within the spirit and scope of the appended claims, the scope of which should be accorded the broadest interpretation so as to encompass all such modifications and similar structure.

What is claimed is:

1. A sort of bypassing lines fabricated on a glass substrate, wherein said glass substrate has chips fabricated thereon for driving transistors on said glass substrate, and said chips are connected in series with a plurality of connecting lines defined on said glass substrate, wherein between two adjacent chips one said connecting line is defined for conveying signals, wherein two terminals of one said bypassing line are connected separately to two different connecting lines to connect with at least one said chip in parallel and to bypass said signals.

2. The bypassing lines of claim 1, wherein said bypassing lines are made of flexible printed circuits boards.

3. The bypassing lines of claim 1, wherein said chips are fabricated on said glass substrate by the chip on glass (COG) technique.

4. The bypassing lines of claim 1, wherein one said bypassing line is connected with one connecting line in parallel by connecting two terminals of said bypassing line separately to two ends of one said connecting line.

5. A sort of bypassing lines fabricated on a display panel, wherein said display panel has a plurality of COG (chip on glass) chips fabricated thereon for driving an array of pixel devices, and on said display panel a plurality of WOA (wire on array) lines are defined for electrical connecting said COG chips in series, wherein between two adjacent COG chips one said WOA line is defined for conveying signals, wherein two terminals of one said bypassing line are connected separately to two different WOA lines to connect with at least one said COG chip in parallel and to bypass said signals.

6. The bypassing lines of claim 5, wherein said bypassing lines are made of flexible printed circuits boards.

7. The bypassing lines of claim 5, wherein said COG chips are gate driver IC chips.

8. The bypassing lines of claim 5, wherein one said bypassing line is connected with one WOA line in parallel by connecting two terminals of said bypassing line separately to two ends of said WOA line.

9. A display panel comprising:
a pixel array, having a plurality of pixel devices for producing images according to input signals;
a plurality of COG chips, fabricated on a peripheral region of said display panel and connected in series, wherein said COG chips can convey said input signals to said pixel array for driving selected said pixel devices,
a plurality of WOA lines, defined on said display panel for connecting said COG chips in series to transfer said input signals; and
a first bypassing bus, fabricated aside said COG chips and connected to two different WOA lines for connecting with at least one said COG chip in parallel and to bypass said input signals.

10. The display panel of claim 9, wherein said first bypassing bus is made of a flexible printed circuits board.

11. The display panel of claim 10, wherein said first bypassing bus has a comb structure, and is divided to a long vertical line and a plurality of short horizontal lines, wherein said long vertical line is disposed parallel with said serial COG chips, and said short lines connected to said long vertical line are extending horizontally to connect said WOA lines.

12. The display panel of claim 9, wherein said COG chips are gate driver IC chips.

13. The display panel of claim 9, further comprising a second bypassing bus connected to two ends of one WOA line for parallel connection.

* * * * *